Figure 1:
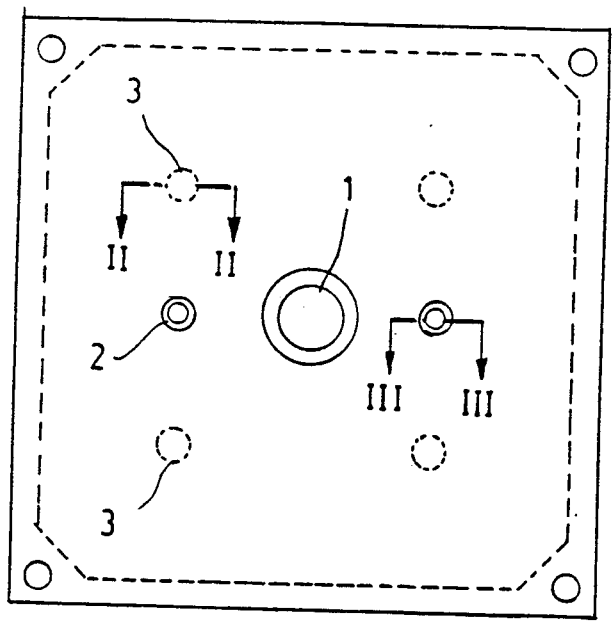

United States Patent [19]

Busse

[11] Patent Number: 5,011,601
[45] Date of Patent: Apr. 30, 1991

[54] FILTER PLATES FOR PLATE FILTER PRESSES

[75] Inventor: Oswald Busse, Aarbergen, Fed. Rep. of Germany

[73] Assignee: Passavant-Werke AG, Fed. Rep. of Germany

[21] Appl. No.: 487,043

[22] Filed: Mar. 2, 1990

[30] Foreign Application Priority Data

Mar. 2, 1989 [DE] Fed. Rep. of Germany ....... 3906537

[51] Int. Cl.[5] ............................................. B01D 25/12
[52] U.S. Cl. ..................................... 210/229; 210/231
[58] Field of Search ....................... 210/229, 231, 227; 100/295, 197, 198

[56] References Cited

U.S. PATENT DOCUMENTS 575,875  1/1897  Kartei .
3,543,938 12/1970  Busse ................................... 210/229

FOREIGN PATENT DOCUMENTS 1761556  1/1969  Fed. Rep. of Germany ...... 210/229
6750400  7/1971  Fed. Rep. of Germany .

Primary Examiner—Robert A. Dawson
Assistant Examiner—Abeer Daoud
Attorney, Agent, or Firm—Larson and Taylor

[57] ABSTRACT

The invention relates to filter plates of plate filter presses, particularly for freeing sewage sludge from water.

The problem of premature failure of the filter cloth is overcome in that the filter cloth is fastened only at some of the support bosses surrounding the central inlet opening and is laid loose over the other bosses. Excessive bulging of the filter cloth when the cake is thrown off is thereby avoided. The filter cloth may be held by a subsequently fastened boss or by a cap engaging over the boss.

5 Claims, 1 Drawing Sheet

FILTER PLATES FOR PLATE FILTER PRESSES

DESCRIPTION

The invention relates to filter plates for plate filter presses in which, in particular, sewage sludge is freed from water. The filter plates, which comprise a filtrate chamber over which a filter cloth is laid, are provided in the filtrate chamber with a plurality of bosses rising approximately to the edge of the filter plate and supported during operation on the bosses of the neighbouring filter plates, thus avoiding the breakage of the filter plates when differences in pressure prevail on the sides of the plates. In the case of large filter plates the bosses are situated in the vicinity of the central inlet opening, because no support is possible there on account of the inlet gap.

There are basically two possible ways of laying the filter cloth in the region of the bosses. Either the filter cloth is allowed to pass loose over the integrally cast bosses, in which case the advantage is achieved that the bosses can be machined to the same height together with the plate edge in a single operation. Or the bosses are loose parts under which the filter cloth is clamped. An intermediate solution consists in making the boss lower and fastening the filter cloth on it by means of a flat cap.

In operation it has been found that laying the filter cloth loose over the bosses leads to premature failture of the filter cloth, particularly in the case of large filter plates. It has been ascertained that the cause of this failure is the excessive bulging of the cloth when sticky filter cake falls off. The over-stretched filter cloth is kinked or clamped at the edge during the next filtering operation and then tears at that point through fatigue.

According to the invention these disadvantages are suprisingly overcome in that the filter cloth is fastened only at some of the bosses and is laid loose over the other bosses. In operation it has been found that a filter cloth clamped in this manner has substantially less tendency to bulge and overstretch. The stress at the bulges is so slight that its life is considerably lengthened.

The fastening bosses are formed in a known manner as loose parts, under which the filter cloth is clamped. In this way sharp bends are avoided in the vicinity of these bosses. When the filter cake falls off, the filter cloth is bent only very slightly. If, in accordance with another concept of the development of the invention, the fastening bosses are made lower than the other bosses, a fastening element can be used in the form of a cap, the edge of which can engage, with the same contour, over the edge of the boss.

In the drawings, forms of construction of the bosses are shown in section (FIGS. 2 to 4), and a filter plate constructed in accordance with the invention is shown in elevation (FIG. 1).

Figure 3:
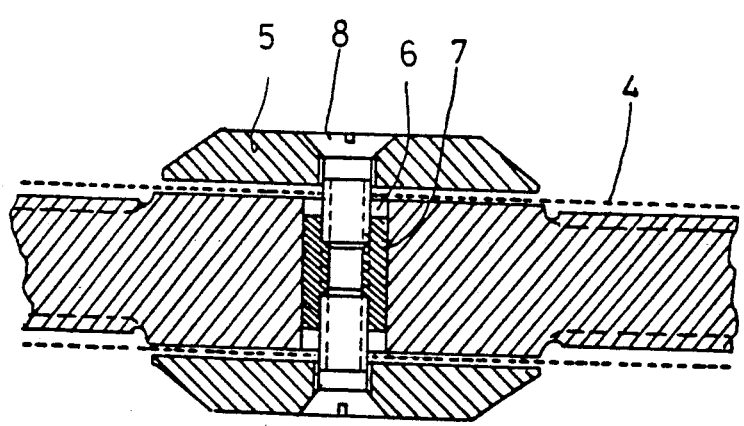
Figure 2:
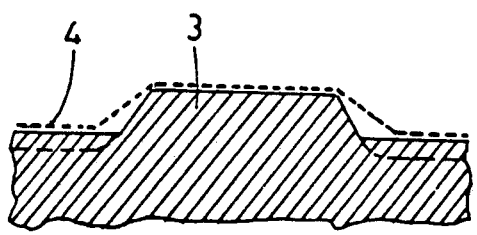
Figure 4:
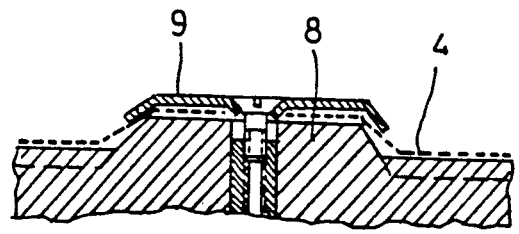

In the elevation (FIG. 1) it can be seen that, of the six bosses 2 surrounding the central inlet opening 1, the middle two are provided with filter cloth fastening. As shown in FIG. 2, the filter cloth 4 is laid loose over the outer four bosses 3. For the fastening of the filter cloth 4 a loose boss 5 according to FIG. 3 is used, being screwed (screw 8) to a threaded blot 7 inserted into the bore 6. The other possible arrangement, shown in FIG. 4, comprises a low boss 8 over which the filter cloth 4 is laid and held by means of a screw cap 9. The loose boss may also be fastened by a clamp pin.

In another arrangement of the spacer bosses it may be expedient for the filter cloth to be held on the outer bosses. In a combined form of construction of the bosses both the boss and the holding cap may be fastened by screws.

I claim:

1. Filter plate for plate filter presses for freeing sewage sludge of water, which has a filtrate chamber over which a filter cloth is laid and from which a plurality of support bosses rise to a level approximately flush with an edge surrounding the filtration chamber, said bosses serving for support on neighboring filter plates, the improvement comprising the filter cloth being fastened only at some of the bosses and being laid loose over the other bosses.

2. Filter plate according to claim 1, the improvement further comprising six bosses disposed symmetrically around the central inlet opening, and wherein only the two middle bosses are used for fastening the filter cloth.

3. Filter plate according to claim 1, the improvement further comprising the bosses to which the filter cloth is fastened being in the form of loose parts under which the filter cloth is clamped.

4. Filter plate according to claim 1, the improvement further comprising a fastening element used in the form of caps engaging over the bosses to which the filter cloth is fastened.

5. Filter plate according to claim 4, the improvement further comprising the caps engaging with the same contour, over the edge of the bosses to which the filter cloth is fastened.

* * * * *